United States Patent
Bultman et al.

(10) Patent No.: US 11,279,590 B2
(45) Date of Patent: Mar. 22, 2022

(54) NON-CONTACT MEASUREMENT OF MATERIAL REMAINING IN EXPENDABLE SPOOLS

(71) Applicant: United States of America as represented by the Secretary of the Navy, San Diego, CA (US)

(72) Inventors: David Alan Bultman, San Diego, CA (US); Rudy Padilla, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 307 days.

(21) Appl. No.: 16/773,753

(22) Filed: Jan. 27, 2020

(65) Prior Publication Data
US 2021/0229947 A1    Jul. 29, 2021

(51) Int. Cl.
| | | |
|---|---|---|
| *B65H 61/00* | (2006.01) | |
| *G06T 7/62* | (2017.01) | |
| *G01B 11/00* | (2006.01) | |
| *G01F 17/00* | (2006.01) | |
| *G01B 11/02* | (2006.01) | |
| *G01B 11/10* | (2006.01) | |
| *G01B 11/04* | (2006.01) | |

(52) U.S. Cl.
CPC ............. *B65H 61/00* (2013.01); *G01B 11/00* (2013.01); *G01B 11/026* (2013.01); *G01B 11/043* (2013.01); *G01B 11/105* (2013.01); *G01F 17/00* (2013.01); *G06T 7/62* (2017.01); *B65H 2511/112* (2013.01)

(58) Field of Classification Search
USPC ........................................................... 33/733
See application file for complete search history.

(56) References Cited

U.S. PATENT DOCUMENTS

| | | | | |
|---|---|---|---|---|
| 2,147,776 A | | 2/1939 | Mitchell | |
| 2,946,127 A | * | 7/1960 | Loewe | G11B 27/34 33/733 |
| 3,091,038 A | | 5/1963 | Daniel | |
| 3,225,446 A | * | 12/1965 | Sarfati | B65H 51/22 33/701 |

(Continued)

FOREIGN PATENT DOCUMENTS

JP        2017190950 A   * 10/2017   ............. G01B 11/06

*Primary Examiner* — Christopher W Fulton
(74) *Attorney, Agent, or Firm* — Naval Information Warfare Center, Pacific; Kyle Eppele; J. Eric Anderson

(57) ABSTRACT

A system and method for non-contact measurement of remaining spooled material. The system comprises at least one optical signal source configured to illuminate spooled material with an optical beam having an optical beam width that illuminates the material remaining in the spool. The optical beam width and spacing are such that spooled material is illuminated by each optical signal source. The system includes drive circuitry configured to drive the at least one optical signal source using pulses. The system further includes at least one optical signal receiver configured to receive light reflected from each of said light pulses. The system still further includes a processor configured to: establish a number and drive strength of the pulses; and cause measurements to be performed of the remaining spooled material.

20 Claims, 5 Drawing Sheets

(56) References Cited

U.S. PATENT DOCUMENTS

| | | | | |
|---|---|---|---|---|
| 4,798,003 | A * | 1/1989 | Haglof | B65H 61/00 33/1 LE |
| 5,267,401 | A * | 12/1993 | Freeman | B65H 23/1806 33/733 |
| 5,721,533 | A * | 2/1998 | Smith | B65H 61/00 340/677 |
| 5,794,883 | A * | 8/1998 | MacEwen | B65H 61/00 242/423.2 |
| 6,068,209 | A * | 5/2000 | Nakamura | B65H 23/063 242/160.1 |
| 6,595,462 | B2 | 7/2003 | Lenski | |
| 6,741,726 | B1 * | 5/2004 | Nevel | G01B 11/105 356/429 |
| 9,533,856 | B2 * | 1/2017 | Spelich | B65H 61/00 |
| 9,791,568 | B2 * | 10/2017 | Bloomfield | H01L 31/107 |
| 9,809,416 | B1 * | 11/2017 | Spruell | B65H 63/08 |
| 9,879,487 | B2 | 1/2018 | Bell | |
| 10,248,886 | B2 | 4/2019 | Ursin | |
| 2014/0250708 | A1 | 9/2014 | Bauer | |
| 2019/0161315 | A1 | 5/2019 | Bergan | |

\* cited by examiner

Measurement Cycle Diagram

NON-CONTACT MEASUREMENT OF MATERIAL REMAINING IN EXPENDABLE SPOOLS

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 104,203.

BACKGROUND OF THE INVENTION

Field of Invention

This disclosure relates to measurement and, more particularly, to measurement of remaining material in expendable fixed-length spools.

Description of Related Art

Many materials are commonly spooled for use. Examples include various types of metal wire (insulated and uninsulated), electrical cables, lines, cords, chains, flexible plastics, rubber rods, fiber optics, glass filaments, and tubes of various constructions.

Spooled materials may be long continuous pieces that are flexible and approximately cylindrical. Spools of material are typically wound one way. The material may be accumulated tangentially around an inner core. Each spool of material may have two ends: the running end and the standing end. The running end is the end from which the spool will be paid out. It is "running" because it is able to move. The standing end, in contrast, is buried by the accumulation of material and is unable to move.

The material may be paid out from the spool in two ways. The most obvious way is by reversing the accumulation process exactly. The last bit of material accumulated on the spool pays out first. Similarly, the first bit of material accumulated on the spool pays out last. The second way is by removing the inner core of the spool. This allows the standing end to become the running end. This way, payout occurs from the center of the spool first. However, the spool does not need to rotate. The layers of material unravel and pay out orthogonally to the way they were accumulated on the spool.

Several methods exist for measuring the amount of material paid out from a spool. The most common method is to measure the number of rotations or speed of rotation for a spool having an inner core. However, a difficulty arises in that each layer of material on the spool contains a different amount of material due to differing radii. Thus, the measurements may contain significant inaccuracies.

Information about the dimensions of the material that is spooled, in addition to the rotational measurements, allow for the amount of material paid to be estimated by calculation. This works equally well for powered payout, like a crane lowering or lifting, or passive payout, like cord being pulled off a spool by a person. Typically, the measurement device is built into a winch, or similar, that houses the spool.

It is possible to ease the difficulty of direct spool measurement by divorcing the measurement device from the winch and spool by using a secondary flywheel. In this variation, the material being paid out takes one or more turns about an instrumented flywheel. This method is applicable to standard payout or center payout but requires hardware of significant size to implement.

Special cases may call for different means for measurement of payout as well. For material that has magnetic or ferrous properties it is possible to use Hall Effect type sensors to count equally spaced markers in the material or to recognize the procession of the material in a center payout application. This method does reduce the hardware burden due to the relative size of the sensor(s). However, it is limited by the requirement for magnetic or ferrous properties.

An analogous method, not requiring magnetic or ferrous properties, uses a bar code scanner in combination with printed labels on the material being paid out. In this way the exact position on the cable can be known. However, this method again places a special requirement, namely marking of the material.

There is a need for a system and method for measuring material payout from spools that do not have the drawbacks and incompatibilities described above.

BRIEF SUMMARY OF INVENTION

The present disclosure provides a system and method for non-contact measurement of material remaining in expendable spools. In accordance with one embodiment of the present disclosure, the system comprises at least one optical signal source configured to illuminate spooled material with an optical beam having an optical beam width that illuminates the material remaining in the spool, wherein the optical beam width and spacing are such that at least one rung of spooled material is illuminated by each at least one optical signal source.

The system further includes drive circuitry configured to drive the at least one optical signal source using pulses, thereby creating light pulses; and at least one optical signal receiver configured to receive light reflected from each of said light pulses.

The system also includes a processor configured to: establish a number and drive strength of pulses for the drive circuitry to drive the at least one optical signal source; and cause measurements to be performed of the remaining spooled material.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of noncontact measurement of material remaining in expendable spools.

DETAILED DESCRIPTION OF THE INVENTION

Disclosed herein is a system and method for non-contact measurement of material remaining in expendable spools. The system and method incorporate one or more optical signal sources that illuminate spooled material that remains in an expendable spool. To accomplish this illumination, an optical beam is used, having an optical beam width that illuminates the material remaining in the spool. The optical beam width and spacing are such that spooled material is illuminated by each of the one or more optical signal sources. Drive circuitry drives the one or more optical signal sources using pulses. One or more optical signal receivers receive light reflected from each of the light pulses. A processor is used to: establish a number and drive strength of the pulses; and cause measurements to be performed of the remaining spooled material. The system and method can be used in gaseous or liquid environments.

Figure 1:
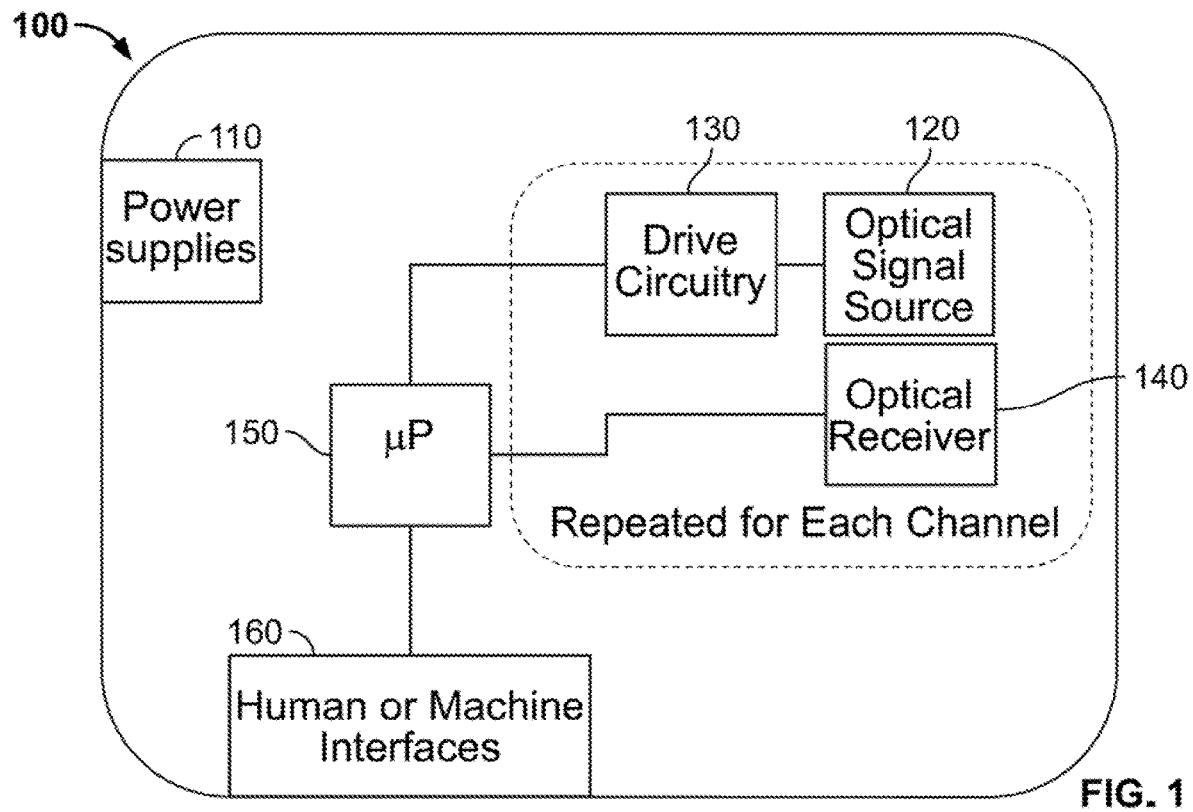
FIG. 1 is a functional system diagram for non-contact measurement of material remaining in expendable spools in accordance with one embodiment of the present disclosure.

FIG. 1 is an illustration of a system for non-contact measurement of material remaining in expendable spools in accordance with one embodiment of the present disclosure. The system 100 includes power supplies 110, one or more optical signal sources 120 and associated drive circuitry 130, one or more optical signal receivers 140, a microprocessor unit 150, and human or machine interfaces 160.

The power supplies 110 may be generic linear or switching supplies performing the necessary conversion from input bus levels to levels appropriate for the system 100. The power supplies 110 may be capable of powering all subsystems, including the one or more optical signal sources 120 and associated drive circuitry 130, one or more optical signal receivers 140, a microprocessor unit 150, and human or machine interfaces 160 illustrated in FIG. 1.

Each of the one or more optical signal sources 120 may be a light emitting diode (LED), which may use the visible spectrum or invisible spectrum such as infrared or ultraviolet. In lieu of an LED, other optical signal sources such as a laser could possibly be used but it would be more expensive. Another option for the one or more optical signal sources 120 is one or more incandescent light sources.

Each of the one or more optical signal sources 120 is configured to illuminate spooled material by emitting an optical beam having an optical beam width that illuminates one or more rungs of the material remaining in the spool. The optical beam width and spacing are such that at least one rung of spooled material is illuminated by each at least one optical signal source. For embodiments where the spooled material is rotated so as to pay out the outer layers of the spooled material, at least one slot or hole may be cut in a side of the spool to facilitate viewing of the spooled material from the side.

Drive circuitry 130 is configured to drive the one or more optical signal sources 120 using pulses, thereby creating light pulses. The drive circuitry 130 may apply a voltage and current to generate a pulse width in the millisecond- or microsecond-range. The drive circuitry 130 causes the one or more optical signal sources 120 to have a known wavelength and a known beam pattern. The drive circuitry 130 also causes the light that is transmitted by the one or more optical signal sources 120 to be relatively consistent.

Figure 2:
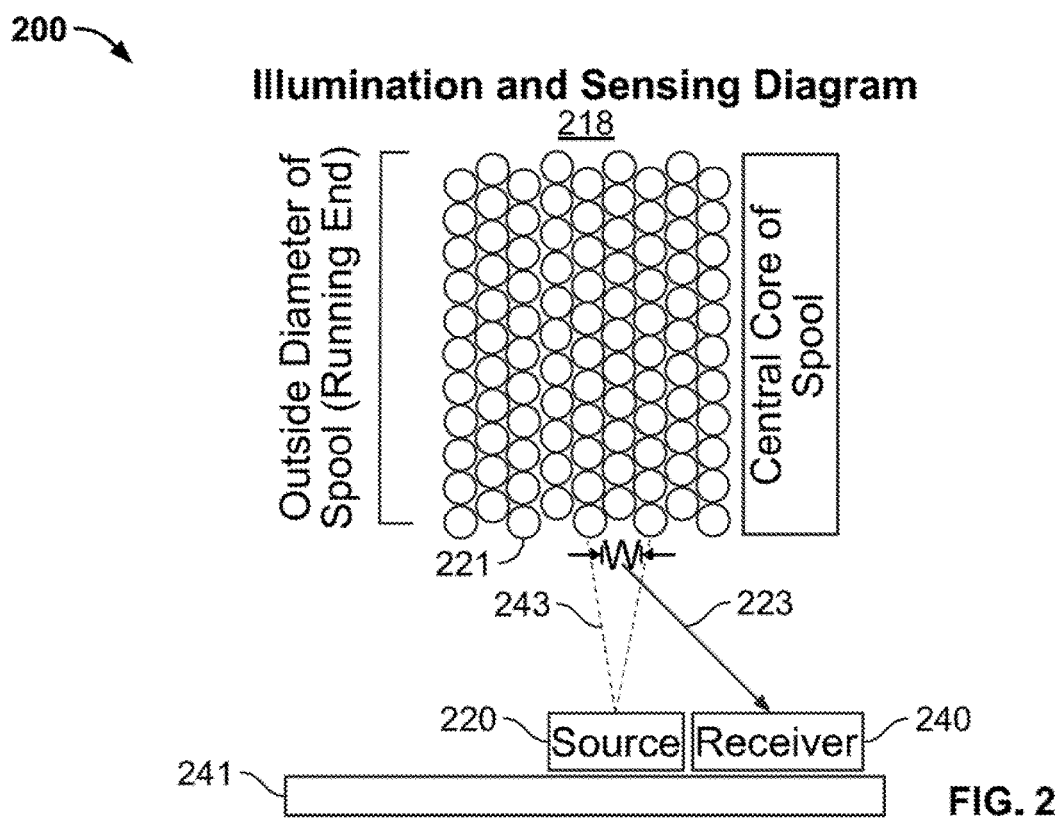
FIG. 2 is an illumination and sensing diagram for use with very small spooled materials in a system for non-contact measurement of material remaining in expendable spools in accordance with one embodiment of the present disclosure.

System 100 works by accumulating (aka integrating) light returned from material on the spool (e.g., spool material 218 shown in FIG. 2). Variables that are taken into consideration in setting the pulse width include: the spacing from source to material, beam width of the source, the attenuation of the beam on its way to the material, reflectivity of the material, attenuation of the beam on its way from the material, spacing from material to receiver, responsivity of the receiver to the wavelength of the source, and the accumulation time. The strength of the pulse (drive current/amount of light) is limited two ways. Consider an LED source for example. The maximum drive current is limited to the DC limit or pulse limit as specified by the manufacturer for an LED. The DC limit is more conservative. It produces less light but at a level that is safe indefinitely so long as ambient temperature is within manufacturer's specification. If a pulse limit is specified it will come with additional information specifying the pulse width and possibly number of pulses allowed. This limit produces much more light but at risk of damage or destruction. The minimum drive current is generally taken to be the test current specified by the manufacturer since we know the LED will operate well at this level. Using a lower drive current level than the test current is allowable subject to the drive current verses light output characteristic of the LED. If less light is needed you can generate less light. This information is generally published by manufacturers.

The receiver operates by accumulation. The receiver has an element that converts received photons/area into electrical charge. Circuity in the receiver allows for the element to accumulate charge for a set amount of time (aka integration time) before counting the amount of charge accumulated. The result is a unit-less number from zero to maximum (generally a power of 2 specified as a number of bits, eg 12 bit=2^12). The boundary cases are the easiest. If one gets zero back for a given time period then one may assume that no light was received during the given time period. Zero is unlikely due to the presence of ambient light sources and/or particulates in the medium between the light source and the spooled material that may reflect back light even if the spool is empty. If the maximum number of accumulated charge is outputted by the receiver, one can assume that the light from the source bounced off something but one really doesn't know much more. Suppose the integration time was seconds or more. Even small amounts of natural light could result a maximum value. Alternatively, an extremely bright light for even a short amount of time would have the same result.

In one embodiment of system 100, the receiver is set to have a minimum accumulation time of around 3 ms and a fixed pulse frequency of 62.5 kHz, 50% duty cycle resulting in approximately 8 μs of LED on-time per pulse. For system 100, it is desirable, but not required to establish a fixed short pulse width so that the only variable is the number of pulses. A threshold value may be established such that if the figure returned by the receiver is above the threshold this indicates that material is present on the spool and vice versa. The threshold value may be set at or above one half of the range of accumulated charge. Initially as we are sensing the material on the spool we are sensing material that is as close as possible. As the material comes off it gets farther and farther away from our sensor. This presents a problem. The farther away the material is the lower the return figure. In the simplest case we want zero return from an empty spool and close to maximum return for a full spool. There will be some crossover point where the sensor says material is not present but there will still be some material at a given rung. Different embodiments of the system 100 may be made with different levels of sensitivity. It is desirable for the system 100 to have enough pulses, at an arbitrary drive strength and pulse width, to achieve near maximum measurable return when a rung is full, and yet not have so many pulses that one continues to get a large return when a rung is empty.

The drive circuitry 130 drives the optical beam from the one or more optical signal sources 120 using very short pulses of less than 100 μs. The number and drive strength/intensity of the pulses is configurable by the microprocessor 150 to allow for widest possible range of optical signal sources and geometries. As a general matter, more pulses or high drive strength provides more illumination. As a result of greater illumination, greater sensing distances may be accomplished.

The system 100 also includes one or more optical signal receivers 140 configured to receive light reflected from each of the aforementioned light pulses. The one or more optical signal receivers 140 may be one or more smart chips that include various configurations of diodes and/or arrays.

The one or more optical signal receivers 140 may be of the LED type, sensitive to the wavelength produced by the one or more optical signal sources 120. Light reflected from each outgoing light pulse is converted to electrical current by the measurement LED and is subsequently digitized and accumulated. During a light pulse, any background light that may exist is also accumulated. To eliminate this issue the background light level is also measured. In between each outgoing light pulse, the one or more optical signal receivers 140 perform this measurement. In this way, only the signal of interest is recorded.

The processes associated with the one or more optical signal sources 120, the associated drive circuitry 130, one or more optical signal receivers 140 are repeated for each channel. For example, a sensor may have five or six channels. It is preferable to have one light source per receiver. Assume they are as close as physically possible. The beam width of the source and the spacing from receiver to material determines the area illuminated. The size of the material in comparison to the area illuminated determines how many rungs are illuminated per source. One example embodiment of the system 100 has enough channels to that 100% of the fully loaded spool is measurable with a given beam width. Another embodiment of the system 100 has only one channel.

Microprocessor 150 may be configured to establish a number and drive strength of pulses for the drive circuitry 130 to drive the one or more optical signal sources 120. Microprocessor 150 may also be used to cause measurements to be performed of the remaining spooled material.

The one or more optical signal receivers 140 also support a digital interface for the microprocessor 150 to extract measurements and change configuration. The drive circuitry 130 for the one or more optical signal sources 120 is built into the one or more optical signal receivers 140. Configuration of the one or more optical signal receivers 140 or the drive circuitry 130 therefore uses the same digital interface.

The microprocessor 150 is of miniature, low-power type. It does not require external memory or storage to perform its function, although those could be implemented. The microprocessor 150 configures and controls all of the drive circuitry 130 and one or more optical signal receivers 140 of the system 100. For example, the microprocessor 150 connects to the digital interface of each of the one or more optical signal source receivers 140 to set the integration time or internal gain. The microprocessor 150 connects to drive circuitry 130 to set the drive strength of each of the one or more optical signal sources 120 and the number of pulses to transmit per measurement.

The microprocessor 150 additionally supports digital human or machine interfaces 160. Example interfaces are Ethernet, serial connectivity like RS-232, or user screens. There are many possible options. The microprocessor 150 can output information in three possible ways. First, it can send raw samples to the human or machine interfaces 160 for processing elsewhere. This is most typical when interfacing to a machine. Second, the microprocessor 150 can transform the raw samples into binary style spooled material present/absent indicators. These are useful for either human or machine interfaces 160. Lastly, the microprocessor 150 can use built in knowledge of the spooled material and spool geometry to output a length remaining estimate. This is also useful for either human or machine interfaces 160.

The microprocessor 150 additionally accepts configuration inputs over the human or machine interfaces 160. This facilitates tuning the low level driver and receiver circuits in the intended application and also allows for configuration of the data outputs.

The data, particularly the measurement data, that is received from the system 100 needs to be made useful so that it may be understood by a human and/or machine. The human or machine interfaces 160 may be employed for these purposes. More particularly, in order for data to be made useful to a human, it may be output in a readable format so that the human can decide how much spooled material has been measured by the system 100. In order for data to be made useful to a machine, it could be communicated to a machine via, e.g., universal serial bus (USB) or serial bus interface (SBI).

Figure 3:
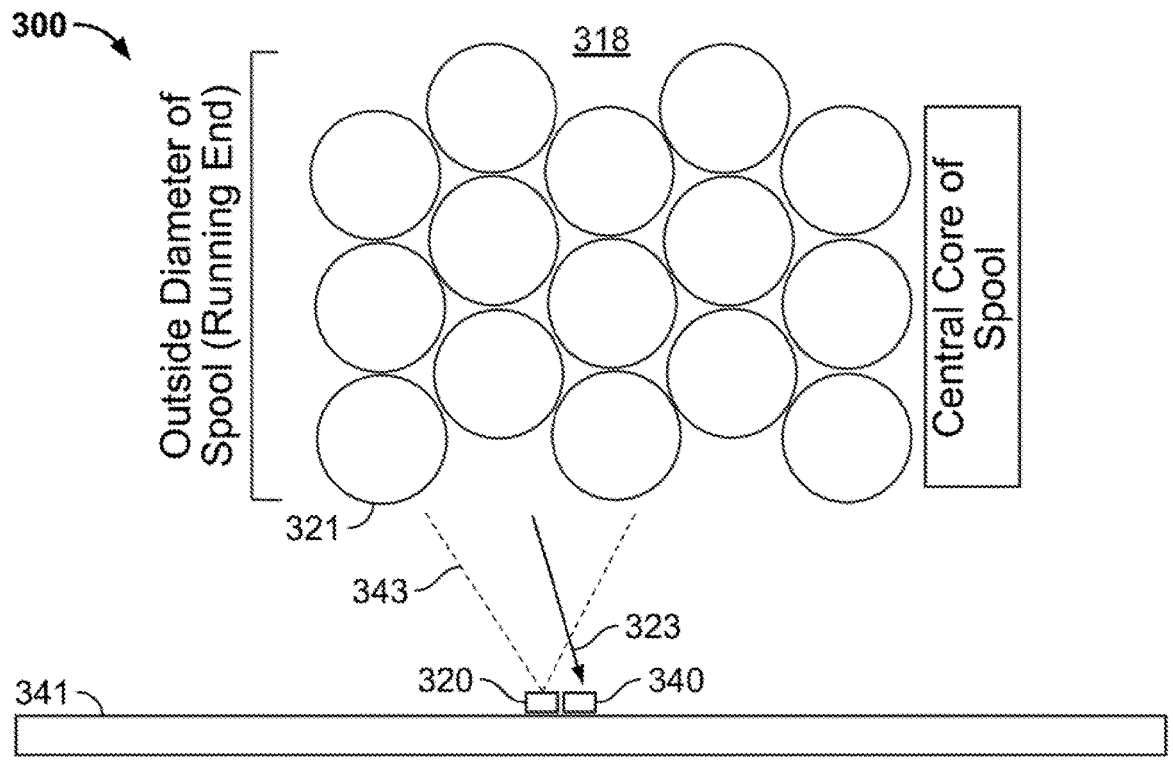
FIG. 3 is an illumination and sensing diagram for use with very large spooled materials in a system for non-contact measurement of material remaining in expendable spools in accordance with one embodiment of the present disclosure.

Optical signal sources for the present system and method are used to illuminate small portions of spooled material as shown in FIGS. 2 and 3 for standard very small and very large payout spools, respectively.

Beginning with FIG. 2, there are many important considerations for the one or more optical signal sources 220 in this system for non-contact measurement of material remaining in expendable spools. The present illustration shows an illumination and sensing diagram 200 in an application involving very small spooled material 218. In this illustration, one or more optical signal sources 220 emit light that is sent to the very small spooled material 218, which is comprised of individual wraps 221 of very small spooled material 218.

When the one or more optical signal sources 220 emit light to the very small spooled material 218, there is reflected light 223 off the very small spooled material 218. The one or more optical signal receivers 240 receive the reflected light 223. The one or more optical signal receivers 240 and the one or more optical signal sources 220 may be deployed in pairs in an array cable to provide the desired coverage of the very small spooled material 218. The arrangement of the receiver/source pairs is unlimited and could even be redundant if desired.

The one or more optical signal receivers 240 may send information received by them to the printed circuit board 241. The printed circuit board 241 may include a processor (not shown) and any other items known in the art to be included with the printed circuit board 241. Various calculations may be performed by the processor 150 so that a measurement value is reached for the very small spooled material 218.

Since the present system for noncontact measurement of material remaining in expendable spools relies on reflected light 223 when sensing, it is important to select a wavelength of light that is well reflected by the very small spooled material 218. In this manner, the reflected light 223 from the very mall spooled material 218 may result in a more accurate measurement by the system for non-contact measurement of material remaining in expendable spools. Additionally, the environment in which the sensing occurs influences the attenuation of the various wavelengths. This is particularly true when sensing spooled materials immersed in liquids, such as for purposes of measuring spooled material that is underwater. Suitable wavelengths for underwater applications include, but are not limited to, infrared (IR) and ultraviolet (UV). IR light is very unlikely to exist in water at depth. It is a low noise case and IR is not damaging to skin/eyes in the lab. IR also does not encourage photosynthesis. That said, UV is also a good choice (left of blue in the visible spectrum). In UV, we have to deal with noise from natural light but it also does not encourage photosynthesis. Even better, studies have demonstrated UV light will kill the microbes in ocean water that are the first to attach to surfaces leading to fouling. Therefore, UV is likely the best for underwater applications since it is self-cleaning. Of course, none of the above prevents the use of visible light. The usable light range for the system 100 may broadly be said to be 200 nm to 1000 nm.

For beam width & spacing considerations, commercially-available LEDs have typically a beam width from 5° to 140°. In some embodiments of the system 100, lenses may be added on top of LEDs or a simple aperture may be used to limit the beam width. Using an aperture results in reduced multipath problems (as discussed below with reference to FIGS. 5A and 5B). Generally, you want the smallest beam width available for the number of channels (complexity) you are willing to deal with. This results in the highest resolution.

The system for non-contact measurement of material remaining in expendable spools may be waterproofed by covering the whole system in a potted shell of urethane, epoxy, or similar that is waterproof and electrically insulating and that is transparent to the wavelength of light being used. In another embodiment, the system for non-contact measurement of material remaining in expendable spools may be put inside a pressure vessel such that the light source transmits, and the receiver receives, through a window. The pressure vessel could be air filled or pressure compensated for deep ocean applications. The window and any fluid used for pressure compensation need to be transparent to wavelength of light being used as before. The advantage of UV becomes clear here since it can be used to keep the sensing window clean underwater. There is an additional bonus to using small beam widths here as it reduces the required size of a window.

The beam width (w) 243 of the one or more optical signal sources 220 is another key consideration. The beam width (w) 243 must be sufficient to provide the desired amount of illumination coverage of the very small spooled material 218, given the physical geometries involved. Different embodiments of the system for non-contact measurement of material remaining in expendable spools will employ different beam width and spacing given the material size and desired resolution. As the material being sensed decreases in diameter, the beam width (w) 243 of the 1 or more optical signal sources 220 must shrink, or the distance between the sensing elements and the material being sensed must decrease. The bracket to the left of FIG. 2 represents the outside diameter of the spool (running end) of very small spooled material 218. The rectangle to the right of the very small spooled material 218 in FIG. 2 represents the central core of the spool.

Referring now to FIG. 3, illustrated is an illumination and sensing diagram for use with a system for non-contact measurement of material remaining in expendable spools of large material in accordance with one embodiment of the present disclosure. In the illumination and sensing diagram 300 of FIG. 3, one or more optical signal sources 320 emit light that is sent to the very large spooled material 318, resulting in reflected light 323 off the very large spooled material 318. One or more optical signal receivers 340 receive the reflected light 323. The one or more optical signal receivers 340 may send information received by them to the printed circuit board 341. The printed circuit board 341 may include a processor (not shown). Various calculations, such as are shown below, may be performed by the processor so that a measurement value is reached.

The larger spooled material in FIG. 3 has a larger cross-sectional diameter than the very small spooled material in FIG. 2. The bracket to the left of FIG. 3 may represent the outside diameter of the spool (running end). The rectangle to the right of the very large spooled material in FIG. 3 may represent the central core of the spool. As the material being sensed increases in cross-sectional diameter in different applications, the beam width (w) 343 of the one or more optical sources 320 must also increase or the distance between sensing elements and the material being sensed must increase. Furthermore, the number of rungs of very large spooled material 318 that the beam illuminates determines the level of resolution of a material remaining measurement. It may be desirable to illuminate a single rung of spooled material since a good achievable resolution is the amount of material spooled on one rung. This figure varies depending on diameter of material being spooled and width of spool.

In order to determine the amount of material that needs to be illuminated, various calculations may be performed as are known in the art. The following calculation assumes the material is level wound and roughly uniform in size. A given spool is specified with several constraints, such as inner diameter (SID), outer diameter (SOD) and width (SW). The material on the spool is specified by cable diameter (COD), number of rungs (NR) and number of wraps (NW). A rung, for purposes of the present disclosure, is a layer of material along the diameter of the spool. A wrap, for purposes of the present disclosure, is a layer of material along the width of the spool.

The innermost rung (at SID) may be labeled as number one with the rung number increasing as the diameter approaches and SOD. A given rung of interest may be designated using X for its rung number within the spool. The diameter at which a given rung lies on the spool is calculated as follows:

Diameter of innermost rung $(D\_R1) = S\_ID + C\_OD/2$  (Equation 1)

Diameter of any rung thereafter $(D\_Rx) = D\_R1 + (X-1)(S\_OD - S\_ID)/N\_R$  (Equation 2)

The quantity (SOD−SID)/NR represents the average displacement along the diameter of the spool per rung on the spool. The amount of material at a given rung is estimated as follows:

Material on a rung $(L\_Rx) = 2\pi N\_W \, D\_Rx/2 = \pi N\_W \, D\_Rx$  (Equation 3)

This calculation may somewhat overestimate the material per rung since it assumes a series of stacked rings rather than a continuous spiral of material. From the calculation, we see, for a given spool with particular material, the amount of material per rung increases as the diameter of the rung increases. If a given sensor illuminates a single rung then the above can be used directly, resulting in the tightest resolution. This assumes the invention reports material on a run in a binary fashion as "present" or "not present". As the material size decreases this increases the difficulty and complexity of the lens requirements for the illuminating LED. It is advantageous in many cases to reduce the complexity by allowing an LED to illuminate several rungs while trading off measurement resolution.

In this instance, the material per rung is calculated as before. The number of rungs illuminated can be estimated in a simple geometric way using knowledge of the spacing between the illuminating LED and the spool along with the half angle intensity of the LED. The half angle intensity refers to the angular width at which the intensity of light output by the LED is fifty percent (50%) of the maximum. This is generally sufficient assuming light baffles are used, such as the opaque blinders 507 shown in FIG. 5B and discussed below. The above also neglects to compensate for any variation in index of refraction as the light from the LED travels to and from the spool. Those variations could be significant in applications where the index of refraction is substantially different from that of air or water and the spacing between the LED and spool is large.

Having calculated the number of rungs illuminated and the material per rung, the resolution of the binary material measurement is known. When using multiple rung illumination, it is possible to perform a non-binary material measurement allowing for resolution below the summation of material in the illuminated rungs. In our experience, a non-binary material measurement has to be experimentally calibrated for the particular use case.

Acceptable levels of resolution can be obtained for a great number of geometries. At one extreme, the beam width and spacing could be such that only a single rung of spooled material is illuminated per optical signal source. This represents a largely binary measurement with respect to spooled material remaining. However, as the cross-sectional diameter of the spooled material decreases the required number of source/receiver pairs quickly becomes unreasonable. The more typical case uses source/receiver pair to sense more than one rung of spooled material. As the illuminated rungs are dispensed the reflected light decreases from maximum to a background level dependent on application. In this instance it is useful to reserve a single source/receiver pair to sense only the background level.

Figure 4:
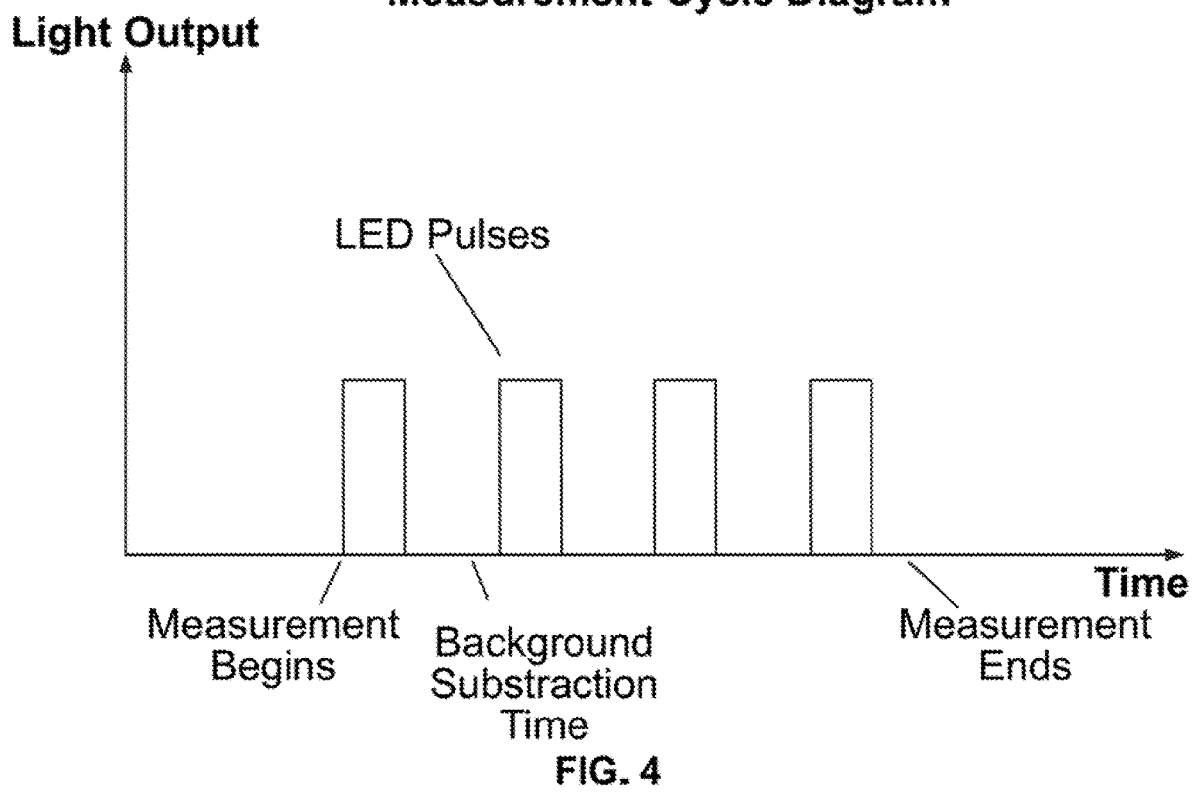
FIG. 4 is a measurement cycle diagram for a system for non-contact measurement of material remaining in expendable spools in accordance with one embodiment of the present disclosure.

FIG. 4 is a measurement cycle diagram for a system for non-contact measurement of material remaining in expendable spools in accordance with one embodiment of the present disclosure. Specific numbers are not assigned to the diagram in FIG. 3. However, it should be understood that, in various applications for noncontact measurement of material remaining in expendable spools, pulse characteristics may be between one (1) and six (6) pulses per measurement, but may be capable of up to two hundred fifty-five (255) pulses per measurement. Fewer pulses may be preferable due to the relatively short distance between the LED and spool of material. Each pulse may be, e.g., approximately seven (7) microseconds in length, with a fifty-percent (50%) duty cycle, and a period of sixteen (16) microseconds (or 62.5 kHz) for two or more pulses.

Figure 5A:
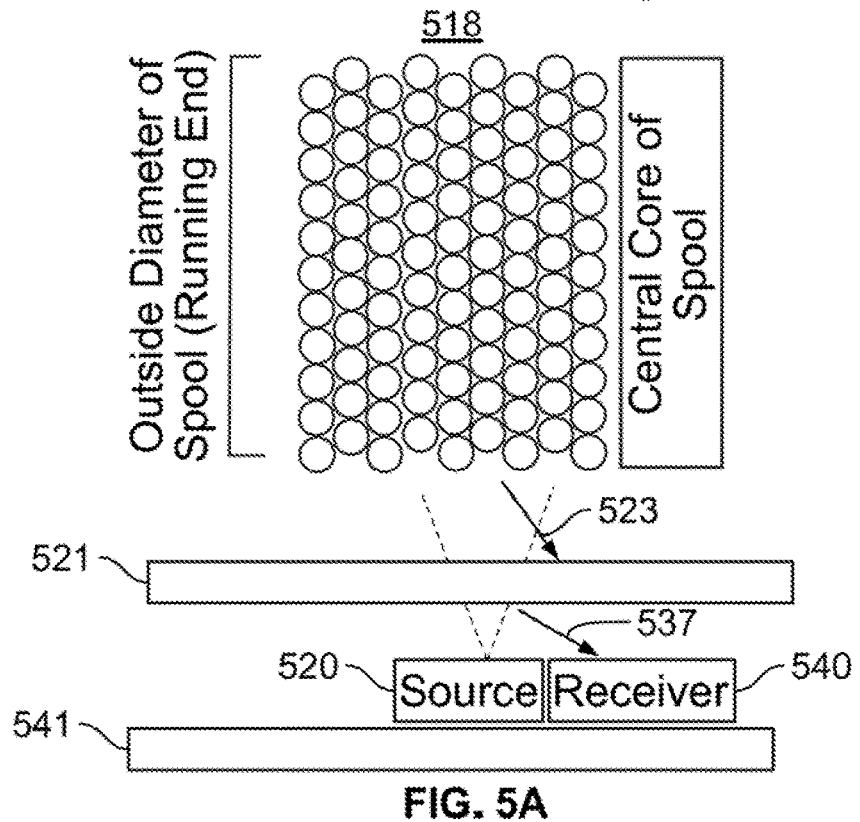
FIG. 5A is a diagram for a system for non-contact measurement of material remaining in expendable spools, without blinders, in accordance with one embodiment of the present disclosure.
Figure 5B:
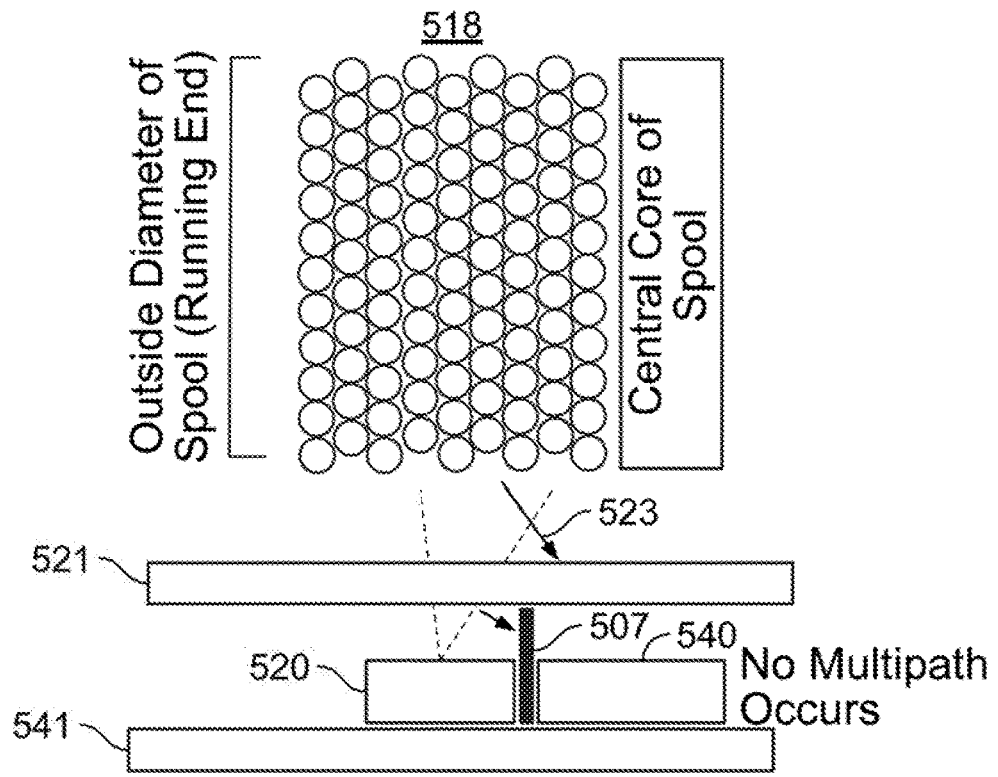
FIG. 5B is the system of FIG. 5A, with added blinders, in accordance with one embodiment of the present disclosure.

It may be desirable for the one or more optical signal receivers to have opaque blinders that prevent output pulses from directly entering the receiver. This requirement is heavily implementation-dependent. FIGS. 5A and 5B illustrate the differences between multipath system without blinders on the receivers (FIG. 5A) and a multipath system with blinders on the receivers (FIG. 5B). FIG. 5A shows one or more optical signal sources 520 that emit light to the very small spooled material 518. Reflected light 523 comes from the very small spooled material 518 to glass 521 or other transparent interface material. The interface material's reflected light 523 is then sent to the one or more optical receivers 540. A printed circuit board 541 is also shown which may include a processor and other components and instructions associated with non-contact measurement of material remaining in expendable spools.

The one or more optical signal receivers 540 may require opaque blinders to prevent multipath problems such as those associated with output pulses that directly enter the one or more optical signal receivers 540. Referring now to FIG. 5B, shown are one or more opaque blinders 507, one or more optical signal sources 520 and one or more optical signal receivers 540. The one or more opaque blinders 507 may be coupled to the one or more optical receivers 540. The one or more opaque blinders 507 are configured to prevent the light pulses from traveling directly from the one or more optical signal sources 520 to the one or more optical receivers 540.

Figure 6:
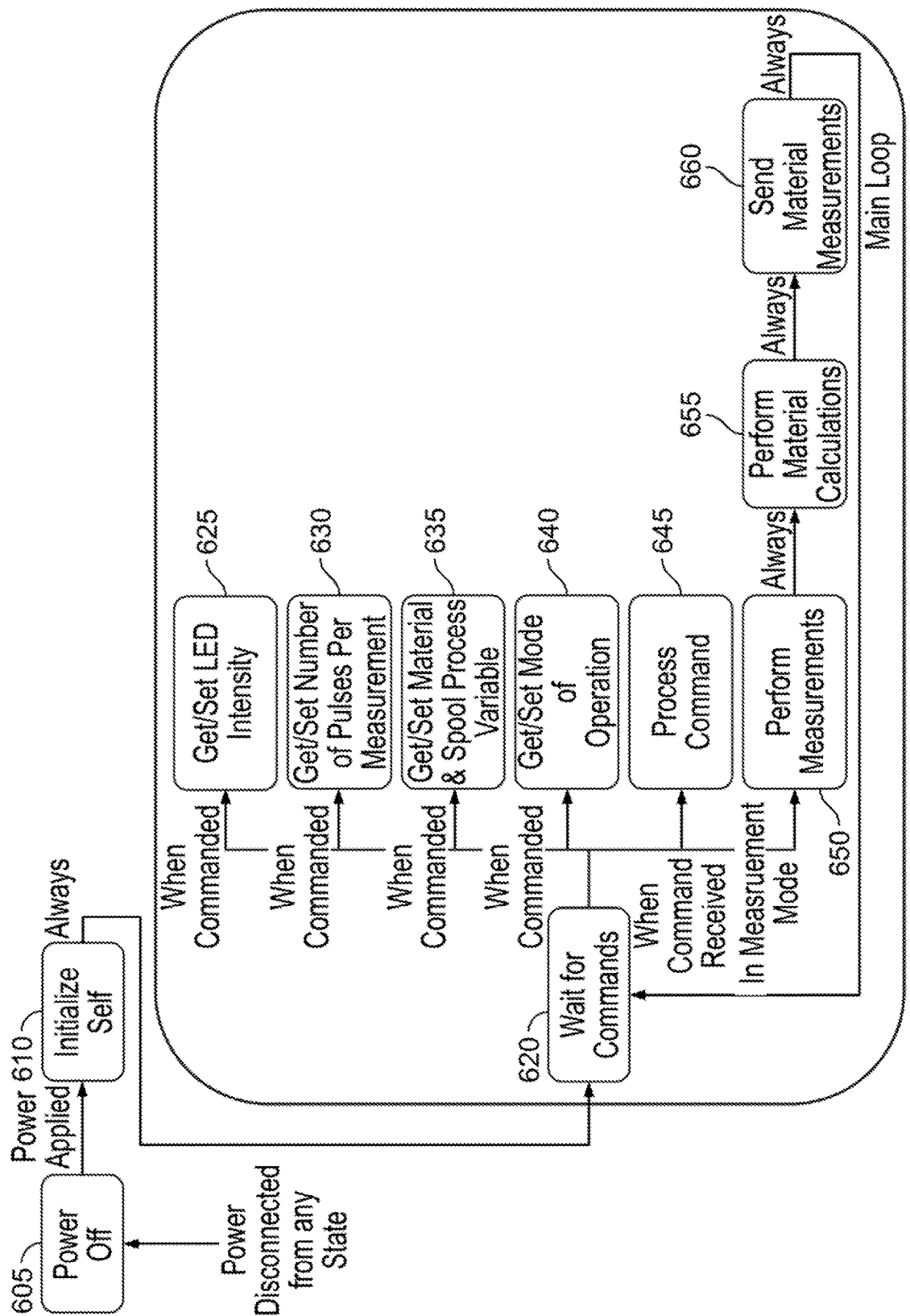
FIG. 6 is a functional operation diagram for non-contact measurement of material remaining in expendable spools in accordance with one embodiment of the present disclosure.

The reflected light 523 from glass 521 or other transparent interface material is then sent to the one or more optical receivers 540. A printed circuit board 541 is also shown which may include a processor and other components and instructions associated with non-contact measurement of material remaining in expendable spools. FIG. 6 is a functional operation diagram for non-contact measurement of material remaining in expendable spools, in accordance with one embodiment of the present disclosure. As shown in the diagram, at step 605, the power is off. At step 610, the system initializes. At step 620, the system waits for commands. For example, when commanded, the system gets/sets the LED intensity at step 625; it gets/sets the number of pulses per measurement at step 630; it gets/sets the material and spool process variables at step 635; it gets/sets the mode of operation at step 640. When the command is received, the system processes the command at step 645. In measurement mode, the system performs measurements at step 650, then performs material calculations at step 655 and sends the material measurement at step 660.

Figure 7:
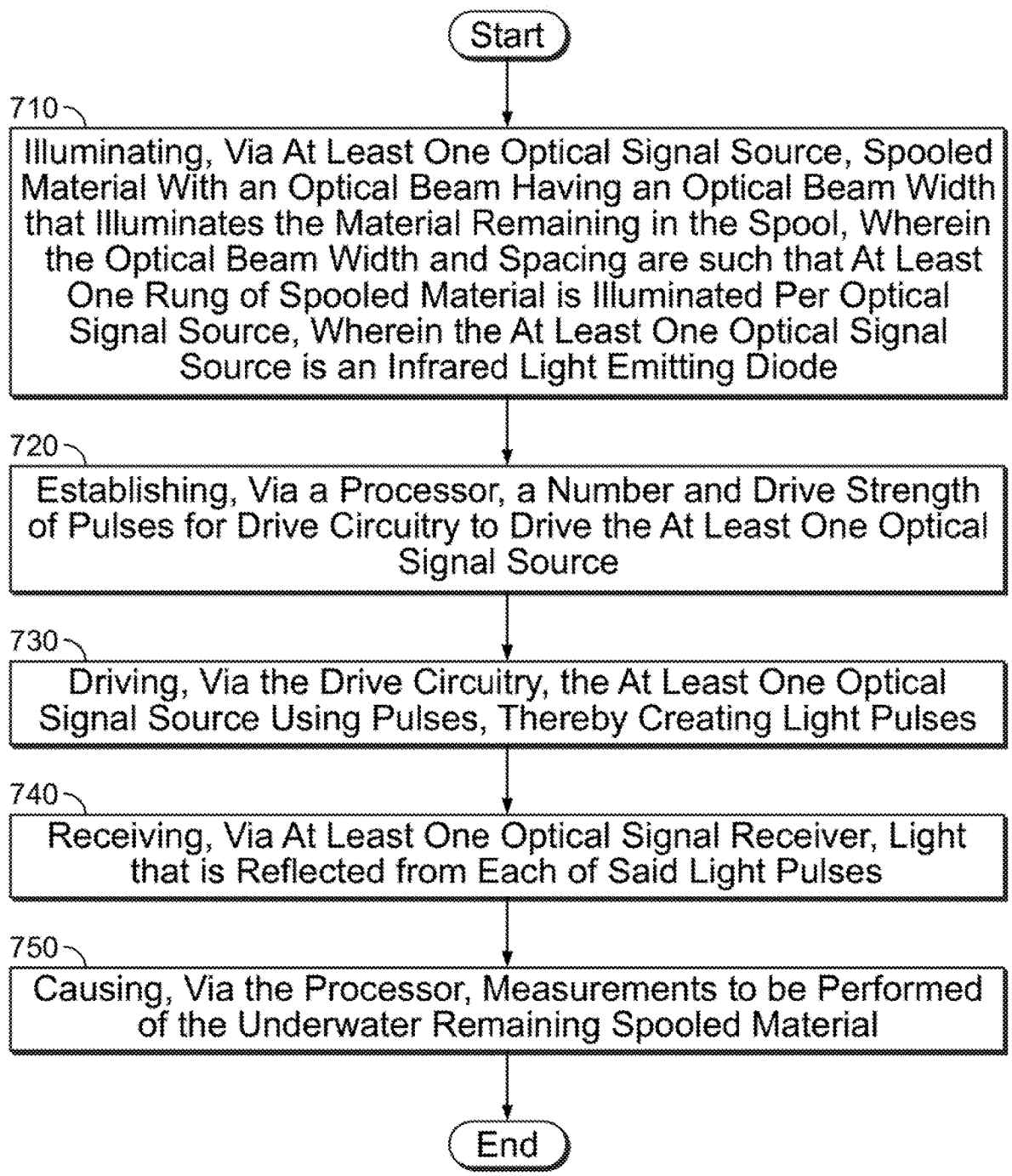
FIG. 7 is a flow chart for a method for non-contact measurement of material remaining in expendable spools in accordance with one embodiment of the present disclosure.

FIG. 7 is a block diagram for a method, from the microprocessor's perspective, for non-contact measurement of material remaining in expendable spools in accordance with one embodiment of the present disclosure.

In accordance with the method 700 in FIG. 7, at step 710 the method includes illuminating, via at least one optical signal source, spooled material with an optical beam having an optical beam width that illuminates the material remaining in the spool, wherein the optical beam width and spacing are such that at least one rung of spooled material is illuminated per optical signal source, wherein the at least one optical signal source is an infrared light emitting diode.

At step 720, the method includes establishing, via a processor, a number and drive strength of pulses for drive circuitry to drive the at least one optical signal source. By establishing the drive strength, an intensity is established for an optical beam from the at least one optical signal source. At step 730, the method includes driving, via the drive circuitry, the at least one optical signal source using pulses, thereby creating light pulses. At step 740, the method includes receiving, via at least one optical signal receiver, light that is reflected from each of said light pulses. Finally, at step 750, the method includes causing, via the processor, measurements to be performed of the underwater remaining spooled material.

The present system and method for noncontact measurement of remaining spooled material is pressure tolerant and works at any ocean depth. There are no moving pieces, reducing the complexity of the system and method.

The present system and method may be used to measure material payout from spools that is agnostic to the method of payout and the type of material. The present system and method additionally do not require a large hardware footprint. The present system and method simplify measurement by measuring the material remaining on a spool rather than the material being paid out from a spool.

The system and method disclosed herein enable an end user or computerized system to measure and evaluate the payout of spooled material. The system and method are effective at measuring nearly any type of material that can be spooled. The system and method take continuous measurements at one or more positions on the spool, depending on the application, and present the information over a simple serial interface. The system and method have configurable resolution of measurement depending on implementation.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments with various modifications as are suited to the particular use contemplated. It is intended that the scope of the invention be defined by the claims appended hereto.

What is claimed as new and desired to be protected by Letters Patent of the United States is:

1. A system for non-contact measurement of remaining spooled material, comprising:
    at least one optical signal source configured to illuminate remaining spooled material with an optical beam having an optical beam width, wherein the optical beam width and spacing are such that at least one rung of remaining spooled material is illuminated by each at least one optical signal source;
    drive circuitry configured to drive the at least one optical signal source using pulses, thereby creating light pulses;
    at least one optical signal receiver configured to receive light reflected from each of said light pulses;
    a processor configured to:
        establish a number and drive strength of pulses for the drive circuitry to drive the at least one optical signal source; and
        cause measurements to be performed of the remaining spooled material.

2. The system of claim 1, wherein the at least one optical signal source is a light emitting diode.

3. The system of claim 2, wherein the light emitting diode is an infrared light emitting diode.

4. The system of claim 1, further comprising one or more opaque blinders coupled to the at least one optical receiver, the one or more opaque blinders being configured to prevent the light pulses from traveling directly from the at least one optical signal source to the at least one optical receiver.

5. The system of claim 1, wherein the processor is further configured to support one or more human or machine interfaces.

6. The system of claim 5, further comprising:
    one or more power supplies configured to power the at least one optical signal source, the drive circuitry, the at least one optical signal receiver and the one or more human or machine interfaces.

7. The system of claim 1, wherein the at least one optical signal source is only one optical signal source, and the at least one optical signal receiver is multiple optical signal receivers.

8. The system of claim 1, wherein the at least one optical signal source is multiple optical signal sources, and the at least one optical signal receiver is only one optical signal receiver.

9. The system of claim 1, wherein the remaining spooled material is underwater.

10. The system of claim 1, further comprising one or more opaque blinders coupled to the at least one optical receiver, the one or more opaque blinders being configured to prevent output pulses from traveling directly from the at least one optical signal source to the at least one optical receiver.

11. The system of claim 1, wherein the at least one optical signal source is only one optical signal source, and the at least one optical signal receiver is multiple optical signal receivers.

12. The system of claim 1, wherein the at least one optical signal source is multiple optical signal sources, and the at least one optical signal receiver is only one optical signal receiver.

13. A method, comprising:
    illuminating, via at least one optical signal source, remaining spooled material with an optical beam having an optical beam width, wherein the optical beam width and spacing are such that at least one rung of remaining spooled material is illuminated per optical signal source, wherein the at least one optical signal source is an infrared light emitting diode;
    establishing, via a processor, a number and drive strength of pulses for drive circuitry to drive the at least one optical signal source;
    driving, via the drive circuitry, the at least one optical signal source using pulses, thereby creating light pulses;
    receiving, via at least one optical signal receiver, light that is reflected from each of said light pulses; and
    causing, via the processor, measurements to be performed of the underwater remaining spooled material.

14. The method of claim 13, wherein the at least one optical signal source is a light emitting diode.

15. The method of claim 14 wherein the light emitting diode is an infrared light emitting diode.

16. The method of claim 13, further comprising:
    preventing, via one or more opaque blinders coupled to the at least one optical receiver, output pulses from traveling directly from the at least one optical signal source to the at least one optical receiver.

17. The method of claim 13, wherein the processor is further configured to support one or more human or machine interfaces.

18. The method of claim 13, wherein the at least one optical signal source is only one optical signal source, and the at least one optical signal receiver is multiple optical signal receivers.

19. The method of claim 13, wherein the at least one optical signal source is multiple optical signal sources, and the at least one optical signal receiver is only one optical signal receiver.

20. An underwater system for non-contact measurement of remaining spooled material, comprising:
- at least one optical signal source configured to illuminate remaining spooled material with an optical beam having an optical beam width wherein the optical beam width and spacing are such that at least one rung of remaining spooled material is illuminated per each at least one optical signal source, wherein the at least one optical signal source is an infrared light emitting diode;
- drive circuitry configured to drive the at least one optical signal source using pulses, thereby creating light pulses;
- at least one optical signal receiver configured to receive light reflected from each of said light pulses;
- a processor configured to:
  - establish a number and drive strength of pulses for the drive circuitry to drive the at least one optical signal source;
  - cause measurements to be performed of the remaining underwater spooled material; and
  - support one or more human or machine interfaces.

* * * * *